Dec. 23, 1969  D. BIERMANN  3,485,222
HELICOPTER ROTOR R.P.M. CONTROL SYSTEM
Filed Dec. 15, 1967  2 Sheets-Sheet 1
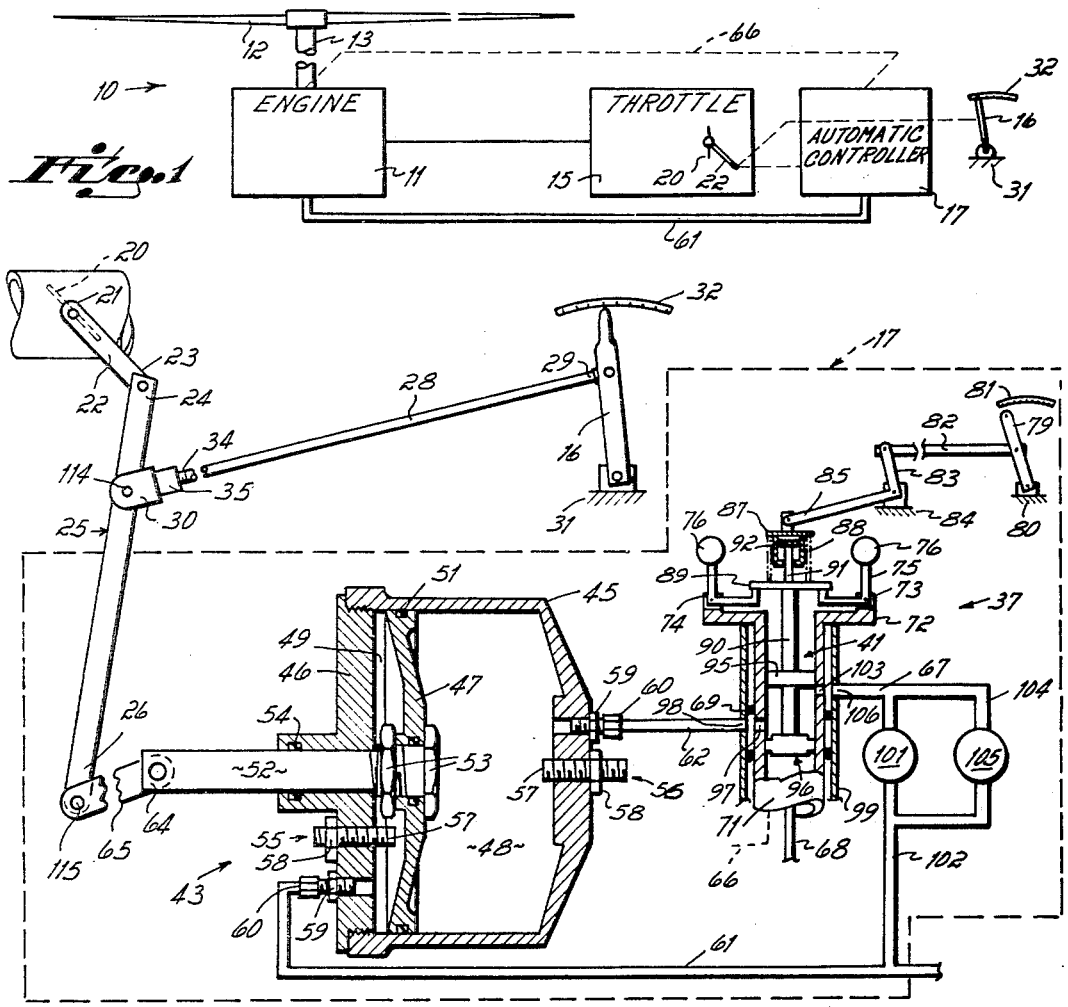
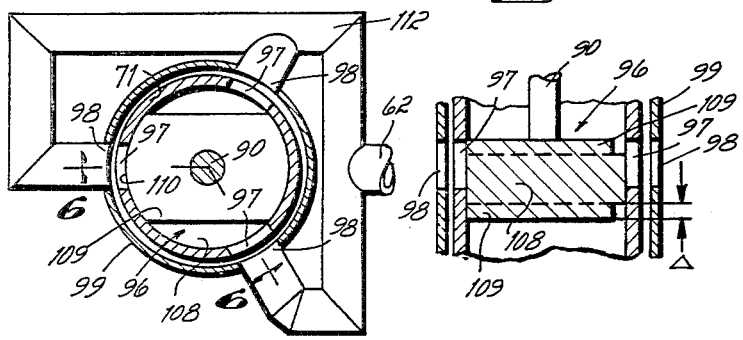
INVENTOR.
David Biermann
Wood, Herron & Evans
ATTORNEYS

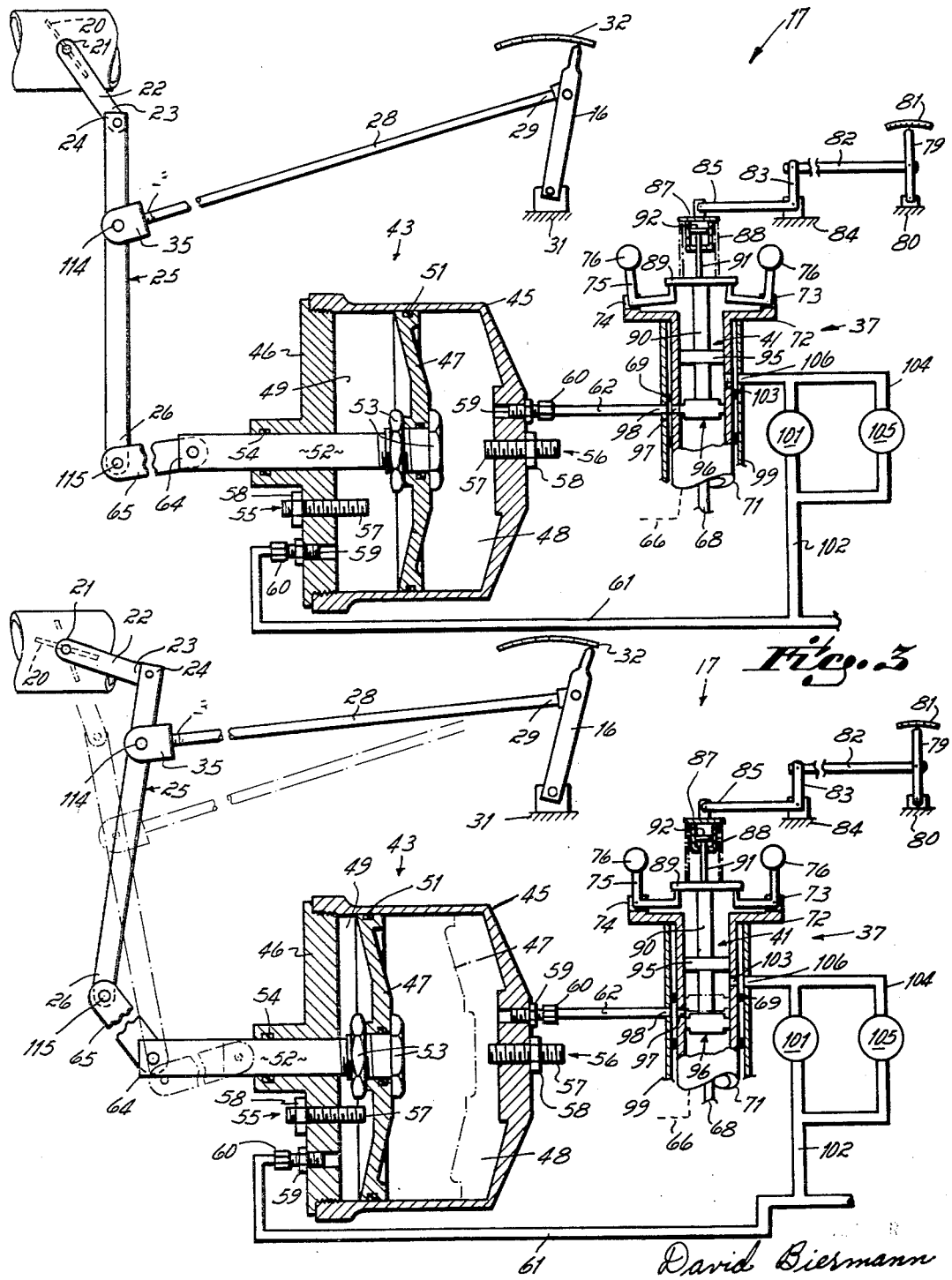

United States Patent Office 3,485,222
Patented Dec. 23, 1969

3,485,222
HELICOPTER MOTOR R.P.M. CONTROL SYSTEM
David Biermann, 1101 Forest Ave.,
Piqua, Ohio 45356
Filed Dec. 15, 1967, Ser. No. 690,884
Int. Cl. F02d 11/02, 31/00; F02m 7/12
U.S. Cl. 123—98            18 Claims

ABSTRACT OF THE DISCLOSURE

A rotor r.p.m. control system for a helicopter power plant having a throttle including, for example, (1) a power handle connected to the throttle for manually adjusting the throttle so that sufficient power is available to achieve a pre-selected control r.p.m., and (2) a controller connected to the throttle for automatically adjusting the throttle toward a setting that permits a pre-selected control r.p.m. to be achieved including, for example, (a) a governor for monitoring the actual rotor r.p.m. and for providing a hydraulic output signal sufficient to establish the control r.p.m., the governor being mechanically linked to the power plant, and (b) a motor for adjusting the throttle setting in accordance with the governor's hydraulic output signal, the motor being hydraulically connected to the governor and mechanically linked to the throttle.

This invention relates to control systems for helicopters and, more particularly, relates to a rotor r.p.m. control system for a helicopter power plant.

A helicopter can be generally defined as an aircraft that sustains itself in flight by motor driven rotating blades or rotors. Each rotor consists of several blades, all designed as airfoils, to be rotated in a horizontal plane. When the rotor accelerates the air vertically downward a lifting force and, hence vertical movement, is provided for the craft. When the rotating blades accelerate the air at an angle to the vertical, there is established a forward thrust in addition to the lifting force, thereby providing forward movement for the craft. The lift of a rotor system, as well as the horizontal speed generated by it, are both varied by regulating the angle at which the airfoil type blades are carried by the vertical rotor axis. That is, the lift and forward thrust of a helicopter during flight are not varied by materially increasing or decreasing the rotor r.p.m., but are controlled by regulating the pitch of the rotor blades.

A number of different rotor arrangements have been utilized with helicopter type aircraft. Some of the basic arrangements that have received the greatest practical application include: a single main lifting rotor with an anti-torque vertically mounted tail rotor; two counter-rotating lifting rotors that are coaxially mounted, that is, on the same vertical axis; two counter-rotating lifting rotors mounted in tandem, that is, one toward the front and one toward the rear of the fuselage; and two inter-meshing or synchronous lifting rotors. However, airfoil shaped rotor blades are used in all types of rotor arrangements, and horizontal and vertical flight movement of the helicopter is controlled by varying the pitch of the rotor blades, and not the rotor r.p.m., in all cases.

The flight controls of a helicopter are complex to allow full exploitation of its capability to move in all directions. The cyclic pitch control, also called the cyclic pitch stick, controls the horizontal movement of the helicopter. The cyclic pitch stick normally occupies a position between the pilot's knees similar to a control stick in a fixed wing aircraft. Generally, the cyclic pitch stick is mounted so as to direct the craft in the same direction in which the stick is moved; for example, as the stick is moved forward the helicopter moves forward, as the stick is moved to the right the helicopter moves to the right, and so forth. The cyclic pitch control provides this directional movement control for the helicopter by varying, individually, the pitch of each lifting rotor blade.

The vertical movement of the helicopter is controlled by the collective pitch control, also called the collective pitch stick. The collective pitch stick is normally mounted so as to direct the craft up as the stick is lifted and down as the stick is depressed. This vertical movement control on most helicopters is placed by the pilot's left hand and, while it may be locked temporarily with a friction lock, most of the time it must be held in the pilot's hand as a precaution against the necessity for sudden autorotation. The collective pitch control provides the vertical position control through varying, simultaneously, the pitch of all rotor blades.

The yaw or rotational movement of the fuselage in, for example, a single lifting rotor helicopter with a vertically mounted anti-torque tail rotor, must also be controlled to prevent undesirable yaw of the helicopter. The yaw control comprises pedals similar to those employed by fixed wing aircraft for rudder control. The pedals, operated by the pilot's feet, generally provide yaw control by varying the pitch on the tail rotor blades.

Thus, a helicopter pilot must control, and constantly monitor, the cyclic pitch control, the collective pitch control and the yaw control during in-flight operation of the helicopter. However, because of the varying power requirements of a helicopter in flight due to its sensitivity to the direction and speed of its movement, air flow pattern, and the like, the throttle on the helicopter's engine also must be constantly monitored by the pilot to maintain a substantially constant rotor r.p.m. Such a constant rotor r.p.m. is desired because helicopters generally operate, as mentioned, at a substantially fixed rotor r.p.m. from take off through flight to set down. That is, in flight the basic characteristics of a helicopter result in a definite interaction or feedback effect among the various controls and this results in drift in the original rotor r.p.m. as determined by the original rotor r.p.m. as determined by the original throttle setting. Therefore, the rotor r.p.m. must, in addition to the other controls, be constantly monitored to keep the rotor r.p.m. within a narrow band of prescribed limits during flight. The throttle may be manually controlled by a motorcycle type twist handle mounted on the collective pitch stick, or it may be controlled by a separate power handle or stick in the cockpit.

For example, a forward movement of the cyclic pitch stick resulting in a higher forward velocity increases the rotor lift and requires a decrease in the collective pitch stick to maintain alitude. This, in turn, produces a lower power requirement from the engine to maintain the desired rotor r.p.m., thereby requiring a slight reduction in throttle setting. The torque effect of the main rotor is decreased by these steps so that an adjustment of pedal pressure is also required for the yaw control to maintain the desired flight direction of the helicopter. Also, for example, if the collective pitch stick only is raised for the sole purpose of increasing helicopter altitude, the rotor r.p.m. decreases so that the throttle must be opened to maintain the desired flight speed and lift of the helicopter, that is, if the collective pitch stick is raised the rotor r.p.m. decreases so that the throttle must be opened to maintain the desired rotor r.p.m., and vice versa. Under operating or in-flight conditions, if the rotor r.p.m. decreases to a low enough level during flight of the helicopter the other controls for the craft become essentially inoperative, that is, the craft will not respond to the other controls, and a catastrophe will result. On the other hand, if the rotor r.p.m. increases to too great a level during flight the engine and rotor blades may be so affected as to fail in the same or a subsequent flight, thereby also resulting in a catastrophe.

As a result of this interrelationship of the flight controls, and particularly of the rotor r.p.m. with the collective pitch, cyclic pitch, and yaw controls, a great deal of skill and dexterity is required on the part of a helicopter pilot. Because of the number of flight controls that need to be constantly monitored, the helicopter pilot must spend a great percentage of his time merely attending to flying the craft and, therefore, has little time to perform other functions. As a matter of fact, it is widely acknowledged that a helicopter pilot is generally subject to a higher degree of tension and fatigue than a pilot of a fixed wing aircraft. In addition, it has been found that normal flight training requires approximately twice as much time for helicopter pilots as for fixed wing pilots.

One objective of this invention has been to provide a rotor r.p.m. control system in combination with a helicopter power plant to permit the rotor speed to be automatically maintained at a pre-selected, fixed r.p.m. during helicopter flight. Such a control system aids in preventing pilot fatigue and, thereby, increases operational safety by obviating the necessity for manual throttle changes by the pilot upon encountering drift in rotor r.p.m. during any attitude of flight. Also, such a control system materially adds to the safety of operation by ensuring that the rotor r.p.m. does not drop to a level where the craft can no longer be controlled, as well as by preventing the rotor r.p.m. from reaching a level where engine and/or rotor failure may result.

A further objective of this invention has been to provide a helicopter rotor r.p.m. control system that can function as a limit stop so as to prevent the operating rotor r.p.m. from exceeding a pre-selected control r.p.m. while permitting the throttle to be manually controlled. This constitutes a particularly useful aid during training of novice helicopter pilots. Such an attribute is useful in avoiding damage to the helicopter power plant because high rotor r.p.m.'s, that is, above recommended maximum limits, can cause material damage to the rotor and engine as well as cause the craft to become uncontrollable.

In accomplishing the objectives of this invention, I have provided a rotor r.p.m. control system for a helicopter power plant controlled by a throttle that preferably includes, (1) a power handle connected to the throttle for manually adjusting the throttle setting so that sufficient power is available to achieve a pre-selected control r.p.m., and (2) a controller connected to the throttle for automatically adjusting the throttle toward a setting that permits a pre-selected control r.p.m. to be achieved including, (a) a governor for monitoring the actual rotor r.p.m. and for providing a hydraulic output signal sufficient to establish the control r.p.m., the governor being mechanically linked to the power plant, and (b) a motor for adjusting the throttle setting in accordance with the governor's hydraulic output signal, the motor being hydraulically connected to the governor and mechanically linked to the throttle. Such an automatic rotor r.p.m. control system has been found to be of substantial aid to helicopter pilots not only during normal operation of the craft but, in addition, during original training of novice helicopter pilots.

Other objectives and advantages of this invention will be more apparent from the following detailed description taken in conjunction with the drawings in which:

FIGURE 1 is a flow diagram illustrating the general environment of the rotor r.p.m. control system;

FIGURE 2 is a partial cutaway view illustrating the controller in the training or upper r.p.m. limit stop position;

FIGURE 3 is a view similar to FIGURE 2 illustrating the controller in the null position during normal in-flight operation;

FIGURE 4 is a view similar to FIGURE 3 illustrating the controller in an underspeed condition with solid lines and an overspeed condition with phantom lines during in-flight operation;

FIGURE 5 is a detailed top view illustrating the hydraulic porting and pilot valve of the governor; and FIGURE 6 is a cross-sectional view taken along lines 6—6 of FIGURE 5.

As illustrated in FIGURE 1, the basic environment of this invention includes a power plant 10 for a helicopter comprising an engine 11 and a rotor 12, the rotor being connected to the engine through drive shaft 13. A throttle 15 is directly connected to the engine 11 for controlling engine speed and a power or throttle control handle 16 is connected to the throttle, the power handle being manually operable and positioned in the cockpit of the helicopter. Also connected to the power plant 10, through the throttle 15, is an automatic controller 17 adapted to maintain the rotor r.p.m. at a pre-selected or fixed r.p.m. level or, alternatively, adapted to act as a rotor r.p.m. limit stop over which the rotor r.p.m. cannot pass.

The automatic controller 17 of this invention is particularly useful with gasoline engines 11 of the reciprocating type, but may also be used with other types of engines. For a reciprocating engine, the throttle 15 generally comprises a carburetor with a suitable butterfly valve 20, the valve being permanently mounted to one end 21 of a fly link 22. The other end 23 of the fly link 22 is pivotally connected to one end 24 of a lever 25, see FIGURE 2. The power handle 16 is pivotally connected to a power arm 28 at one end 29 and the other end 30 of the power arm 28 is pivotally connected to the lever 25 intermediate the ends 24, 26 of that rod. The power handle 16 is pivotally mounted to a fixed base 31 in the helicopter cockpit and cooperates with a power scale 32 so the pilot can knowingly provide the engine 11 with enough power to attain the desired rotor r.p.m. Power arm 28 is preferably provided with a threaded end 34 and a mating sleeve 35 pivotally connected to the rod 25 so the operating length of the power arm 28 may be varied as desired to correlate engine speed with the power scale 32 reading. In addition, the power handle 16 is provided with lock means, not shown, such as, for example, a friction lock, that permits the pilot to lock the power handle in any desired position.

The automatic controller 17 includes a motor 43 hydraulically connected at one side to a governor 37. The other side of the motor 43 is mechanically connected to the other end 26 of the lever 25. The primary function of the motor 43 is to move the throttle 15, that is, the butterfly valve 20, in accordance with hydraulic signals received from the governor 37. The motor 43 comprises a piston cup 45 and a T-shaped cup head 46 threadedly connected to the piston cup. A piston 47 is mounted within the piston cup 45, the piston 47 dividing the chamber defined by the head 46 and cup 45 into two separate chambers, namely, a governor oil chamber 48 and an engine oil chamber 49. The piston 47 mounts at its outer periphery an O-ring 51 seal to maintain hydraulic separation between the two chambers 48, 49. A piston stem 52 is connected, through nuts 53, to the piston 47, and it extends outwardly through the cup head 46. The stem of the T-shaped cup head 46 is provided with an O-ring seal 54 to prevent leakage along the stem 52 from the engine oil chamber 49 to the atmosphere. The outer end 64 of the piston stem 52 is pivotally connected to a piston link 65, the link 65 being pivotably connected at its other end to the end 26 of the lever 25. The transducer 43 is also provided with adjustable stops 55, 56 for each side of the piston 47, each stop comprising a stud 57 threadedly engaged with the cylinder cup head 46 and with the piston cup 45 bottom, respectively, and a locking nut 58 for each stud. Of course, each chamber 48, 49 of the motor 43 is provided with a suitable oil fitting 59 and coupler 60. Engine oil chamber 49 communicates hydraulically with the engine 11 through engine oil feed line 61 that originates at the engine 11 and governor oil chamber 48 communicates hydraulically with a pilot valve 41 of the governor 37 through governor oil line 62.

The automatic controller 17 also includes the variable r.p.m. governor 37. The variable r.p.m. governor 37 includes means for selecting the control r.p.m. that is, that rotor r.p.m. which the governor is expected to maintain, monitor means for sensing the actual rotor r.p.m., and compensating means for developing an output signal sufficient to adjust the throttle setting so as to establish the control r.p.m. The governor 37 is mechanically connected by suitable linkage 66, shown diagrammatically in broken lines, to the helicopter power plant 10 for monitoring the rotor r.p.m. The governor 37 is hydraulically connected to a high pressure oil feed line 67, the governor oil line 62 and a drain line 68 so as to effectively develop and automatically adjust the hydraulic output signal as required for the motor 43.

The governor 37 includes a hollow rotating shaft 71 connected by the linkage 66 with the power plant 10 to rotate shaft 71 at a speed directly proportional to the speed of the power plant. A head 72, integral with the hollow shaft 71, extends transversely from the free end of the shaft. The head 72 carries an outer peripheral rim 73, the rim having two slots 74 each of which receives an L-shaped pivot arm 75 to which a flyball 76 is mounted. This structure permits the governor 37 to monitor constantly the actual rotor r.p.m.

The control means by which the control rotor r.p.m. may be selected includes a preset r.p.m. handle 79 pivotably mounted to a fixed base 80 in the helicopter cockpit. The r.p.m. handle 79 cooperates with an r.p.m. scale 81 for pre-selecting the intended rotor control r.p.m. to be established by the governor 37. A linkage arm 82 is pivotably connected to the r.p.m. control handle 79 at one end and to a bell crank 83 at the other end, the bell crank also being pivotably connected to a fixed base 84. The free end 85 of the bell crank 83 is pivotably connected to a spring cup 87. A spring 88 is disposed between the spring cup 87 and a face plate 89 mounted to a pilot valve stem 90. A centering rod 91, connected at one end to the face plate 89, extends into the spring cup 87 and carries a guide button 92 at its other end within the cup. The button 92 slides within the spring cup 87 and, thereby, maintains alignment of the spring cup, spring 88, and pilot valve stem 90 during operation of the governor 37. Thus, under static conditions as the r.p.m. control handle 79 setting is adjusted for selecting a control rotor r.p.m., the compression on the speeder spring 88 is varied.

The governor 37 also includes the pilot valve 41 for establishing the hydraulic output signal of the governor. The pilot valve 41 includes the pilot valve stem 90, a leakage land 95, and a control land 96, the control land being shown in detail in FIGURES 5 and 6. The land 96 cooperates with control ports 97 in the hollow rotating shaft 71 which, in turn, cooperates with a port 98 in stationary sleeve 99 surrounding the shaft 71, the ports 97, 98 also being shown in detail in FIGURES 5 and 6.

The ports 98 are provided with coupling lines, shown diagrammatically, that interconnect the ports with governor oil line 62, see FIGURES 5 and 6.

The governor drain line 68 interconnects with the hollow rotating shaft 71 below the control ports 97 to provide a drain line for returning oil from the motor's governor oil chamber 48 to the engine when the control land 96 is positioned above the control ports 97, see phantom position in FIGURE 4. Generally, the hydraulic pressure in the drain line 68 is around atmospheric pressure.

High pressure governor oil is provided by a booster pump 101 located in an engine oil feed line 102 connected to the engine oil source. The pump 101 raises the engine oil pressure of, for example, 50 to 75 p.s.i. to a governor oil pressure of, for example, 200 to 250 p.s.i, as the oil is pumped into the high pressure oil feed line 67. The feed line 67 communicates with the inside of the hollow shaft 71 through inlet port 106 in the sationary sleeve 99 and inlet port 103 in the shaft 71. The inlet ports 106, 103 are positioned above the outlet ports 97, 98. The lands 95, 96 of the pilot valve 41 are spaced a far enough distance apart so that an internal chamber can be defined within the hollow shaft 71, the chamber having both inlet 106, 103 and outlet 97, 98 ports. Positioned between the rotating hollow shaft 71 and the stationary sleeve 99, in between the inlet ports 106, 103 and outlet ports 97, 98, is a packing 69 to hydraulically separate the inlet ports from the outlet ports. The booster pump 101 is provided with a bypass line 104 connected to the high pressure feed line 62 and engine oil feed line 102, the bypass line having a relief valve 105. The operating p.s.i. level of the relief valve 105 establishes the governor oil pressure in line 62 and permits the governor oil pressure to be maintained at the operating level when the pilot valve 41 is in the null position, the null position being that position of the control land 96 when the actual rotor r.p.m. is equal to the control rotor r.p.m. see FIGURE 3.

The preferred control land 96 geometry and outlet ports 97, 98 for the governor 37 are more specifically illustrated, as mentioned, in FIGURES 5 and 6. The control land 96 comprises a primary piston head 108 with a secondary block 109 mounted on the top and bottom of the head, the blocks 109 being substantially rectangular in shape with convex ends 110 and being centered relative to the axis of piston head. The blocks 109 extend above the top and bottom surfaces of the piston head 108 a distance Δ. The hollow rotating shaft 71 is provided with three circular outlet ports 97, the port diameters preferably being substantially equal, and being less than the peripheral length of the arcs defined by the convex ends 110 of the secondary blocks 109. The stationary sleeve 99 surrounds the rotating shaft 71 with a minimum of clearance and also carries suitable ports 98 with coupling lines 112 interconnecting each of the ports 98 and the governor oil line 62, thereby establishing essentially continuous fluid contact between the line 62 and the rotating hollow shaft ports 97 during operation of the governor.

The peripheral dimension of each secondary block end 110 is such that when the control land 96 is in the position as illustrated in FIGURE 6, only two of the three ports 97 will be connected to ports 98, because the third port will be always closed by one end 110 of secondary block 109. Thus, only two ports will be open until the control land 96 is depressed a Δ distance from the null or completely closed position so that the third port is opened, but as soon as the third port is opened additional pressure will reach the governor oil line 62 to quicken movement of the piston 47 in the motor 43, thereby decreasing the reaction time or delay in changing the throttle setting. This valve structure permits a relatively slow response or reaction time of the throttle setting to the hydraulic signal ouput of the pilot valve 41 when minor r.p.m. corrections are required, that is, those corrections where the deviation from the control r.p.m. setting is not large, and permits a faster response when larger r.p.m. corrections are required. This is because first two, and then all three, outlet ports 97 are opened in the pilot valve 41 as the control land 96 is displaced axially along the hollow shaft 71, the amount of axial displacement from the null position, illustrated in FIGURE 3, being dependent on the actual rotor r.p.m. relative to the control rotor r.p.m. set by r.p.m. control handle 79.

In order that the helicopter rotor r.p.m. control system can function during normal flying operations, the power handle 16 must be set at a position relative to the power scale 32 so that sufficient power is always available to permit the control r.p.m., as set by the control r.p.m. handle 79, to be achieved. The power handle 16 is locked by lock means, not shown, in this position so as to establish a pivot point 114 about which the lever 25 can pivot. Preferably, the power handle 16 is positioned to open the throttle 15 an amount that will give a rotor r.p.m. substantially greater than the control r.p.m. desired and, in some cases, the helicopter pilot may want to fly the helicopter with the throttle full open. However, even though the power handle 16 is set at full open position, that is, all the way to the right as shown in the figures, the automatic controller 17 so regulates the rotor r.p.m. as to maintain it at the pre-selected control rotor r.p.m.

During in-flight operation of the helicopter, it is desirable to maintain the control land 96 of the governor's pilot valve 41 in the null position. The primary piston 108 completely closes the outlet ports 97, 98 at the null position because the downwardly directed spring 88 pressure offsets the upwardly directed pressure caused by the centrifugal force generated by the flyballs 76. At the null position, illustrated in FIGURE 3, no high pressure oil is being transferred to the motor 43 so that the hydraulic pressures in the engine oil chamber 49 and the governor oil chamber 48 of the motor are substantially equal, thereby placing the rotor r.p.m. control system in an equilibrium condition. When the control system is in equilibrium the actual rotor r.p.m. is substantially equivalent to the control r.p.m. as set by the r.p.m. control handle 79.

Upon the helicopter encountering flight conditions that cause the actual rotor r.p.m. to decrease, the upwardly directed force on the piston valve shaft 90, as generated by the flyballs 76, is decreased and the opposing downwardly directed spring 88 force thereby causes the control land 96 to move down, as illustrated in solid lines in FIGURE 4, to open the outlet ports 97, 98. High pressure governor oil then flows through the pilot valve 41, through governor oil line 62, and then into the motor's governor oil chamber 48 to force the piston 47 left because the pressure of the governor oil is greater than the oil pressure in engine oil chamber 44. The pivot point 114 is fixed, because the power handle 16 is locked in position, so that movement of the piston 47 toward the left causes the lever 25 to pivot clockwise, about fixed point 114 and thereby adjust the throttle 15 (by pivoting the butterfly valve 20) so that additional power from the engine is generated to return the actual rotor r.p.m. to the pre-selected control r.p.m. As the rotor r.p.m. increases, the upwardly directed force on valve shaft 90 (caused by centrifugal force of flyballs 76) is also increased so the control land 96 moves back toward the null position.

If helicopter flight conditions are such as to cause a rotor r.p.m. overspeed condition, the upwardly directed force on the pilot valve shaft 90 generated by the flyball's centrifugal force will overcome the downwardly directed force of the spring 88 to move the control land 96 of the pilot valve 41 above the outlet ports 97, 98 of the pilot valve, see phantom line position of FIGURE 4. At this position of the control land 96, the motor's governor oil chamber 48 is open to the drain or return line 68. The drain line 68 is at substantially zero pressure so that the piston 47 moves toward the right because the pressure in the motor's engine oil chamber 49 now exceeds the pressure in the governor oil chamber 48. As the piston 47 moves right, the lever 25 pivots counterclockwise about fixed point 114, thereby closing the throttle 15 (by pivoting the butterfly valve 20) to a setting that permits the pre-selected control r.p.m. to be achieved once again. As the actual rotor r.p.m. decreases, the control land 96 is forced back toward the null position by the speeder spring 88 pressure.

When it is desired to utilize the control system 17 of this invention to establish an upper rotor r.p.m. limit over which the rotor r.p.m. cannot pass for training or other purposes, the control system is operated in the manner illustrated in FIGURE 2. The rotor r.p.m. control handle 79 is positioned relative to the control r.p.m. scale 81 at that r.p.m. level above which the actual rotor r.p.m. is not to exceed. When the control system 17 is operated in this manner, the helicopter pilot must manually control the rotor r.p.m. by varying the position of the power handle 16 and, thereby, gets a feel for the interrelationship of the different helicopter flight controls. The control system 17 can operate in this manner because, by placing the r.p.m. control handle 79 at a setting which would give an undesirably high rotor r.p.m., the control land 96 on the pilot valve 41 is forced below the outlet ports 97, 98 due to the high compression placed on the spring 88.

The control land 96 is maintained in that position so the outlet ports 97, 98 remain open because the upwardly directed centrifugal force generated by the flyballs 76 is not sufficient, at normal and desirable rotor r.p.m. operating levels, to overcome the downwardly directed speeder spring 88 force and close the ports 97, 98. That is, the motor's governor oil chamber 48 is constantly open to the high pressure governor oil from the booster pump 101, thereby holding the piston 47 against the motor's lefthand stop 55 and creating a fixed pivot point 115 for the lever 25. The piston 47 will only move from the lefthand stop 57 if the rotor attains the undesirable high r.p.m. but, if such a high rotor r.p.m. is achieved, the governor 37 will take over and prevent the r.p.m. from going higher. Thus, the fixed pivot point about which the lever 25 pivots is at the joinder of piston link 65 and control rod 25, namely, the manual pivot point 115. Since the pivot point 115 is now fixed, as the power handle 16 is manually positioned and repositioned the throttle 15 setting (through butterfly valve 20) is positioned and repositioned. As a result, the helicopter pilot manually controls the rotor r.p.m. by varying the position of the power handle 16 and, if he permits the rotor r.p.m. to get up to the control r.p.m. setting, the control system 17 will prevent the r.p.m. from going higher.

Having described my invention, what I desire to claim and protect by Letters Patent is:

1. An r.p.m. control system for a helicopter power plant having a throttle, said control system comprising
 a power handle for manually adjusting the throttle to a preferred setting by which a preselected r.p.m. is achieved,
 a controller for automatically adjusting said throttle about the preferred setting to maintain constant the preselected r.p.m., said controller including (a) a governor connected to said power plant for monitoring the actual r.p.m. and for providing an output signal responsive to the difference between the actual r.p.m. and the preselected r.p.m., and (b) a motor for adjusting said throttle setting about the preferred setting in accordance with the governor's output signal, said controller being operable for automatic adjustment when the preselected r.p.m. is within a prescribed range of regular operational settings, and
 linkage connected to the throttle for linking both said power handle and said motor to said throttle, said linkage including a first point of interconnection with said power handle and a second point of interconnection with said controller, and said linkage providing manual throttle adjustability about said second point and automatic throttle adjustability about said first point.

2. A control system as set forth in claim 1 wherein said linkage comprises a lever connected at one end to said motor to provide said second point and connected at the other end to said throttle, and a power arm connected at one end to said lever at a point in between said ends to provide said first point and connected at the other end to said power handle.

3. A control system as set forth in claim 1 wherein said governor includes hydraulic means for providing a hydraulic output signal, said motor being hydraulically connected to said governor.

4. A control system as set forth in claim 3 wherein said motor comprises
   a cylinder, one end of said cylinder being hydraulically connected to said governor and the other end of said cylinder being hydraulically connected to a substantially constant pressure oil source,
   a piston movable within said cylinder and dividing said cylinder into a governor oil chamber and a constant pressure oil chamber, and
   a piston rod connected at one end to said piston and at the other end to said throttle.

5. A control system as set forth in claim 4 wherein said linkage comprises a lever connected at one end to said piston rod to provide said second point and connected at the other end to said throttle, and a power arm connected at one end to said lever at an intermediate point between the ends to provide said first point and connected at the other end to said power handle.

6. A control system as set forth in claim 4 including means for making said piston immobile, thereby making said lever position controllable by said power handle.

7. A control system as set forth in claim 4 including means for locking said power handle in position, thereby making said lever position controllable by said governor and said motor.

8. A control system as set forth in claim 5 including a piston link connected between said lever and said piston rod.

9. A control system as set forth in claim 2 wherein said governor includes
   means for varying the pre-selected control r.p.m. for the power plant.

10. A control system as set forth in claim 3 wherein said hydraulic means includes a pilot valve comprising
    a control land having a primary piston head with a secondary block mounted on the top and bottom of said head, said secondary blocks being rectangular in shape with convex ends, and
    structure defining a series of at least three outlet ports, said control blocks cooperating with said ports to permit hydraulic fluid to enter or leave said pilot valve.

11. A control system as set forth in claim 10 wherein said ports are circular.

12. A control system as set forth in claim 10 wherein said outlet ports are in a hollow rotatable shaft and said control land moves axially within said shaft to open and close said ports.

13. A control system according to claim 3 wherein said hydraulic means includes a pilot valve comprising
    a cylinder including at least two outlet ports,
    means connecting said ports to said motor,
    a control land within said cylinder having a primary piston head engaging the internal surface of said cylinder and a secondary block mounted on one side of said head, said secondary block partially engaging said cylinder surface at a position alignable with only one of said ports, whereby a portion of said outlet ports are uncovered in a first increment of movement of said control land and all outlet ports are uncovered upon a greater increment of movement of said control land.

14. A control system for the rotational speed of a helicopter rotor, the helicopter rotor being driven by an engine whose speed is controlled by a throttle valve, the control system comprising:
    a cylinder having a piston dividing the cylinder into a constant pressure chamber and a governor fluid chamber,
    an oil reservoir,
    linkage means connecting the piston to the throttle valve to operate the throttle valve in response to the position of the piston,
    means connecting the constant pressure chamber of said cylinder to a source of low pressure hydraulic fluid,
    means connecting a source of high pressure fluid to the governor fluid chamber of said cylinder, and
    an engine speed responsive governor driveably connected to said engine, said governor including three-way valve connected between said high pressure source and said governor fluid chamber and also connected between said governor fluid chamber and a reservoir, to admit high pressure fluid to said governor fluid chamber when said engine speed deviates from a pre-selected value in one direction and to drain fluid from said governor fluid chamber to said reservoir when said engine speed deviates from said pre-selected value in the other direction.

15. A control system for the rotational speed of a helicopter rotor, the helicopter rotor being driven by an engine whose r.p.m. is controlled by a throttle valve, the control system comprising
    a manual control operatively linked to the throttle for providing manual adjustability of the throttle to any position within the throttle's range of settings, and
    an automatic control linked to the throttle for automatically providing within a limited portion of the throttle's range of settings a variation of the throttle adjustment about the position of the manual throttle setting to maintain a preselected rotor r.p.m., said automatic control including (a) means for preselecting a reference r.p.m., (b) a governor for providing an output signal responsive to the difference between the actual r.p.m. and the reference r.p.m., and (c) a control motor for relating the automatic control to the throttle and for varying the throttle adjustment in accordance with the output signal from the governor to maintain the rotor r.p.m. constant at the reference r.p.m., said control motor having a limited range of response for providing automatic adjustability of the throttle to any position within a limited portion of the throttle's range of settings,
    said throttle being automatically adjustable by the automatic control to maintain the rotor r.p.m. constant at the preselected reference r.p.m. when the control motor is operating within its limited range of response, and being otherwise manually adjustable by the manual control.

16. A control system for the rotational speed of a helicopter rotor as set forth in claim 19 further comprising
    a lever for linking both the manual control and the automatic control to the throttle, said lever linking the controls to the throttle so that the throttle is controlled jointly by the positions of said controls.

17. A control system for the rotational speed of a helicopter rotor as set forth in claim 20 wherein
    the lever is pivotally connected to each of the controls so that the throttle is independently controlled by one of said controls when the position of the other control is fixed.

11

18. A control system for the rotational speed of a helicopter rotor as set forth in claim 20 wherein
the lever is pivotally connected to each of the controls and to the throttle so that the controls can be compensatingly moved without affecting a movement of the throttle, thereby permitting the automatic control to override the manual control to maintain the rotor r.p.m. constant at the preselected reference r.p.m. when the manual control is moved within the range of response of the motor.

12

References Cited

UNITED STATES PATENTS 2,746,247   5/1956   Bevins _____ 123—98
2,873,728   2/1959   Biermann _____ 123—98

FOREIGN PATENTS 872,013   1/1942   France.
875,613   6/1942   France.

CORNELIUS J. HUSAR, Primary Examiner